July 22, 1958 H. K. SHAW 2,844,387
PREFABRICATED CRASH CUSHION
Filed Jan. 10, 1956
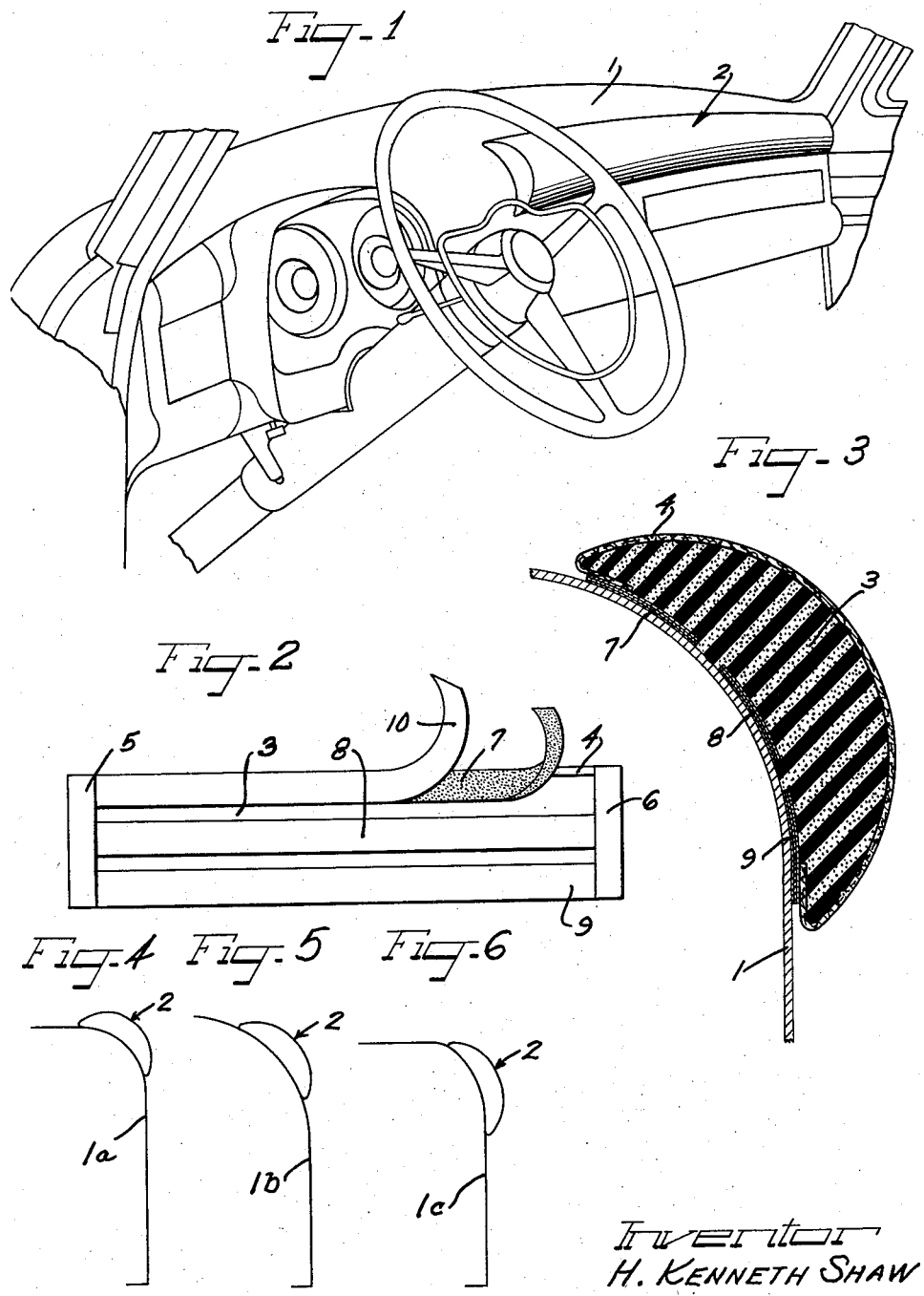
Inventor
H. Kenneth Shaw

United States Patent Office 2,844,387
Patented July 22, 1958

2,844,387

PREFABRICATED CRASH CUSHION

Harold Kenneth Shaw, Chicago, Ill., assignor to The Scholl Mfg. Co., Inc., Chicago, Ill., a corporation of New York Application January 10, 1956, Serial No. 558,332

1 Claim. (Cl. 280—150)

This invention relates to improvements in a prefabricated crash cushion, and more particularly to a crash cushion readily attachable to the dashboard or instrument panel of an automotive vehicle to cushion the blow of a passenger coming into contact with the instrument panel by virtue of a sudden stop, although the invention may have other uses and purposes as will be apparent to one skilled in the art.

In the past, a number of automotive vehicles, such as passenger automobiles, have appeared on the market with cushioning means built in over the upper and inner corner of the instrument panel so as to minimize injury to the occupant of the vehicle by virtue of an accident or sudden stop. However, there are many passenger automobiles now appearing on the market and which have appeared on the market within the past few years, wherein the instrument panel is of metal or rigid plastic, and may have protruding dials, handles, etc., and no means whatever are provided to cushion the blow of an occupant forcibly contacting that instrument panel. While certain automobiles provide the crash cushions as an optional accessory, most of the automobiles have no provision whatever for such a device, and it has been virtually impossible heretofore to install any such crash cushion in many of the automobiles.

With the foregoing in mind, it is an important object of the instant invention to provide a prefabricated crash cushion, which is so constructed that it may readily and easily be installed in a very few moments by the purchaser himself in substantially any automobile not so equipped already.

Another object of the invention is the provision of a prefabricated crash cushion which may be merely pressed into position on the most prominent region of an instrument panel, and the cushion is automatically secured in place against accidental dislodgement.

Also a feature of the invention is the provision of a prefabricated crash cushion carrying means for readily securing the same to the instrument panel of an automobile, and which crash cushion may be varied in its curvature to conform to the contour of any specific instrument panel, whereby the same crash cushion may be utilized in many and various make of automobiles.

Still a further feature of the invention resides in the provision of a prefabricated crash cushion that is readily distortable at the time of application to conform to substantially any instrument panel curvature.

A further object of the invention resides in the provision of a prefabricated crash cushion carrying adhesive means on one face thereof for ready and easy attachment of the cushion to the instrument panel of an automobile.

It is a still further object of the instant invention to provide a prefabricated crash cushion which may be manufactured in very few sizes and shapes and yet fit substantially all makes of automobiles, and which cushions may be covered with any suitable decorative material in keeping with or in contrast to the interior appointments of any particular automobile.

While some of the more salient features, characteristics and advantages of the instant invention have been above pointed out, others will become apparent from the following disclosures, taken in conjunction with the accompanying drawing, in which—

Figure 1 is a somewhat diagrammatic and fragmentary view of the instrument panel of an automobile equipped with a crash cushion embodying principles of the instant invention;

Figure 2 is an elevational view of the face of the crash cushion that contacts the instrument panel, with parts elevated to disclose parts therebeneath;

Figure 3 is a greatly enlarged fragmentary transverse cross sectional view through the cushion showing the same in operative position on the instrument panel;

Figure 4 is a diagrammatic view illustrating how the cushion may be adapted to a particular curvature of an instrument panel;

Figure 5 is a view similar in character to Fig. 4, but illustrating a different curvature on the instrument panel; and Figure 6 is a view similar to Figs. 4 and 5, illustrating the cushion mounted on an instrument panel having a still different curvature.

As shown on the drawings:

The illustrated embodiment of the instant invention is shown in Fig. 1 mounted on the instrument panel 1 of an automobile over that region of the panel just forward of a passenger occupying the so-called "death" seat, namely the right-hand portion of the front seat. The crash cushion, generally indicated by numeral 2, is shown affixed in position on the instrument panel over the upper and innermost part of the panel in position to cushion the blow against a person thrown forwardly against the panel. As will be more fully explained later herein, it should be especially noted that the crash cushion 2 may readily be distorted to conform intimately with substantially any curvature of instrument panel, so that it is a very simple expedient to press the crash cushion firmly against the panel in the desired position, and it is securely mounted against accidental dislodgement.

With reference now to Figs. 2 and 3, it will be seen that the crash cushion embodies an elongated, transversely arcuate or concavo-convex body 3 made of a suitable cushioning material. One satisfactory material is foam latex which is greatly resistant to fatigue and compaction, which is soft and yielding with adequate cushioning powers, and which has very high restorative powers. As seen clearly in Fig. 3 the body 3 is preferably thicker in the central or intermediate region than it is along the side edges, and as seen best in Fig. 1, one end of the cushion body 3 is preferably wider than the other end, the wider end being usually disposed toward the center of the automobile.

The body 3 may be covered at least over the outer or convex surface with a suitable covering 4, of any suitable material such as plastic, leatherette, upholstery fabric, etc. This covering may be colored as desired to either blend with or contrast to the interior colors of the particular vehicle.

Preferably the instrument panel contacting surface or the convex surface of the crash cushion is equipped with a pressure sensitive adhesive surfacing, over all or part of the convex face of the cushion, by means of which the cushion is readily secured to the instrument panel. In Fig. 2 I have illustrated a preferable form of adhesive for this purpose, and in this instance the adhesive is in the nature of spaced strips of double-faced adhesive tape. Preferably there are laterally extending strips 5 and 6 at the respective ends of the cushion, and a plurality of longitudinally extending strips, there being three in the illustrated instance designated by numerals 7, 8 and 9, extending between the end strips 5 and 6. These lateral strips are preferably spaced apart, and this strip arrangement is desirable because it enables the cushion to be distorted or conformed intimately to the contour of any particular instrument panel. As seen in Fig. 2, each strip of double-faced adhesive tape is preferably covered on its exposed surface with a temporary backing strip 10 which protects the adhesive surface until time for attachment to the instrument panel, whereupon the backing strip is removed and discarded. It is also preferable, in the event the cushion body 3 is of foam latex, to apply some rubber cement first to the latex and let the cement dry before attaching the inside face of the adhesive face thereto. This insures positive and long lasting adherence which is substantially impossible to break without disruption of the body 3 itself.

When it is desired to mount the instant invention, it is a simple expedient to remove the respective backing strips 10 from the adhesive, and press the cushion firmly into the desired location on the instrument panel as clearly seen in Fig. 3, the exposed adhesive surfaces then firmly holding the cushion in position on the panel. No skill is necessary in order to perform a proper mounting operation.

In Figs. 4, 5 and 6 I have illustrated various shapes or curvatures of instrument panels and shown how the same cushion 2 may be distorted in order to intimately conform to the contour of any instrument panel curvature. In Fig. 4 there is an instrument panel 1a having a relatively high curvature of relatively small radius, and the crash cushion 2 is more or less compacted over the main point of curvature.

In Fig. 5, there is an instrument panel 1b indicated which has a downwardly sloping curvature of greater radius, and the cushion 2 is somewhat flattened in order to conform to that particular curvature.

In Fig. 6 an instrument panel 1c is disclosed that has a rather soft curve approaching the vertical, and here the crash cushion 2 is disposed more forwardly than in Figs. 4 and 5, and flattened to a little greater extent so as to adequately conform to that particular curvature. The use of strips of adhesive tape spaced apart on the back of the cushion better enables the cushion to be distorted to conform to particular curvatures of instrument panels, than would be the case if one solid sheet of adhesive were used. The end strips 5 and 6 maintain the ends of the crash cushion firmly against the panel so that there is no danger of the cushion curling or becoming partially separated from the panel during use.

From the foregoing it is apparent that I have provided a novel prefabricated crash cushion which is economical to build, and which may be readily installed in substantially any automobile by the purchaser himself. The crash cushion is also readily conformable to substantially any contour or curvature of instrument panel, and when once attached the cushion will remain in place indefinitely and adequately perform its desired function.

It will be understood that modifications and variations may be effected without departing from the scope of the novel concepts of the present invention.

I claim as my invention:

A crash cushion for attachment to the instrument panel of an automobile, comprising a transversely concavo-convex elongated body portion of cushioning material, a covering over the convex face of said body portion, a transversely extending strip of double-faced adhesive tape at each end of the concave face of said body part, and a plurality of longitudinally extending and laterally spaced strips of double-faced adhesive tape between said end strips.

References Cited in the file of this patent

UNITED STATES PATENTS

| | | |
|---|---|---|
| 2,070,760 | Straith | Feb. 16, 1937 |
| 2,292,024 | Dreher | Aug. 4, 1942 |
| 2,332,357 | Uffelman | Oct. 19, 1943 |
| 2,436,461 | Tritt et al. | Feb. 24, 1948 |
| 2,789,862 | Boyer | Apr. 23, 1957 |

FOREIGN PATENTS

| | | |
|---|---|---|
| 834,651 | Germany | Mar. 24, 1952 |